United States Patent Office 3,461,208
Patented Aug. 12, 1969

3,461,208
INDOMETHACIN COMPOSITIONS
Charles A. Winter, Blue Bell, Pa., assignor to Merck & Co., Inc., Rahway, N.J., a corporation of New Jersey
No Drawing. Continuation-in-part of application Ser. No. 328,578, Dec. 6, 1963, which is a continuation-in-part of application Ser. No. 131,093, Aug. 14, 1961. This application Nov. 1, 1966, Ser. No. 591,113.
Int. Cl. A61k 17/16, 27/00
U.S. Cl. 424—243
2 Claims

ABSTRACT OF THE DISCLOSURE

Dexamethasone (or a like anti-inflammatory adrenocortical steroid is combined with indomethacin (or a like anti-inflammatory indole) in a single pharmaceutical dosage form to make it possible to administer a smaller amount of the steroid.

---

This application is a continuation-in-part of Ser. No. 328,578, filed Dec. 6, 1963, now abandoned, which in turn is a continuation-in-part of Ser. No. 131,093, filed Aug. 14, 1961, now abandoned.

This invention relates to anti-inflammatory preparations and particularly to a pharmaceutical preparation in unit dosage form which combines a corticosteroid such as dexamethasone with indomethacin or a similar α-(3-indolyl)-lower aliphatic acid compound. This invention also relates to a method of treating inflammation by the coadministration of such indoles and such steroids.

The management of inflammatory conditions with corticosteroids is well known. This class of compounds is recognized by those skilled in the art and the ones which may be used in the practice of this invention, and their unit dose amounts are:

| | Mg. |
|---|---|
| Cortisone | 4–25 |
| Hydrocortisone | 4–20 |
| Prednisone | 0.75–5 |
| Prednisolone | 0.75–5 |
| Methylprednisolone | 0.75–4 |
| Fluprednisolone | 0.30–1.5 |
| Triamcinalone | 0.75–4 |
| Dexamethasone | 0.125–0.75 |
| Betamethasone | 0.10–0.6 |
| Paramethasone | 0.40–2 |

All of these corticosteroids cause undesirable side effects when administered in a therapeutic dose over extended periods of time. For example, they variously cause a moonfaced appearance, osteoporosis peptic ulcer complications, and adrenocortical insufficiency. For this reason it is the usual practice to administer them in the lowest possible doses compatible with the desired effect and any method of achieving their potent beneficial results without these side effects is a great advance in the therapy of inflammation.

The present invention achieves this reduction in corticosteroid by combining with it indomethacin or closely chemically related indole compounds. Indomethacin is sold under the trademark Indocin (Merck) and a unit dose of it in the present invention is from 5 to 25 mg.

Its preferred chemical name is 1-(p-chlorobenzoyl)-5-methoxy-2-methyl-indole-3-acetic acid and it can be named as 1-p-chlorobenzoyl - 2 - methyl-5-methoxy-3-indolyl-acetic acid. Other chemically and physiologically related compounds are:

1-(p-chlorobenzylidene)-5-methoxy-2-methylindene acetic acid, 5–25 mg.
1-(p-chlorobenzoyl)-5-dimethylamino-2-methylindole acetic acid, 10–50 mg.
α-1-(p-methylmercaptobenzoyl)-5-methoxy-2-methylindole propionic acid, 10–50 mg.
α-1-(p-chlorobenzoyl)-5-methoxy-2-methylindole propionic acid, 15–75 mg.
α-1-(p-methylmercaptobenzyl)-5-methoxy-2-methylindole propionic acid; also named as: α-(1-p-methylthiobenzyl-2-methyl - 5 - methoxy-3-indolyl) propionic acid, 7.5–100 mg.
α-1-(p-chlorobenzyl)-5-methoxy-2-methylindole propionic acid, 40–200 mg.

The esters and/or salts of the above steroids or indole compounds may be used as well.

These indole compounds, like the steroids, exhibit a high degree of anti-inflammatory activity and are themselves useful for the treatment of arthritic and related conditions. However, because they too are potent substances, it is desirable to use the lowest dose possible to obtain the desired beneficial therapeutic effect.

In accordance with the present invention it has been found that a combination of one of the above-mentioned corticosteroids and one of the above-mentioned indole compounds produces a synergistic degree of anti-inflammation, activity, thereby making it possible to lower the dose level so that the undesirable side effects are minimized. In severe inflammatory conditions, the higher amounts of the selected steroid and the selected indole may be combined with beneficial results as a greater anti-inflammatory response will be obtained than can be achieved with either drug alone even if an extremely large dose is given. A physician may prefer such high doses, despite the adverse side effects, to give a patient adequate relief from pain. In describing the action of these mixtures or combinations as synergistic, I therefore mean either that the combined activity of the two components is greater than the sum of the activities when the components are used alone, or that the use of the combination permits the achievement of the same therapy with doses of steroids greatly reduced over those needed when the steroid is used alone.

The novel compositions of this invention comprise pharmaceutical preparations suited for oral, topical or parenteral administration and they are prepared by techniques and skills known in the pharmaceutical art. They include tablets or capsules for oral administration, where the active ingredients are mixed with binders, fillers and excipients such as starch, glucose or lactose, and syrups or elixirs where the anti-inflammatory agents are dissolved or suspended in a suitable liquid vehicle. For topical use, creams, ointments, jellies, solutions or suspensions containing the anti-inflammatory agents are employed, and for parenteral, intra-muscular or intra-articular administration, sterile solutions or suspensions are used.

In making up the compositions of the invention, one of the corticosteroids within the range given above would be combined with the selected indole within the stated range. This unit dosage form would be taken one to four times daily at spaced time intervals, as indicated by the need of the particular patient.

This invention is illustrated by the following examples:

EXAMPLE 1

| | Per tablet, mg. |
|---|---|
| Prednisolone | 1.125 |
| Sodium α - (1 - p - methylthiobenzyl - 2 - methyl-5-methoxy-3-indolyl)-propionate | 7.500 |
| Lactose | 79.375 |
| Starch, corn | 5.000 |
| Cellulose acetate phthalate (as 2% in acetone) | 2.000 |
| | 95.000 |
| Add: | |
| Starch, corn | 5.00 |
| Guar gum | 5.00 |
| Magnesium stearate | 2.00 |
| | 107.00 |

The prednisolone, sodium α-(1-p-methylthiobenzyl-2-methyl-5-methoxy-3-indoyl)-propionate, lactose and corn starch are reduced to a fine powder by milling and remixing. The mixture is granulated with the cellulose acetate phthalate solution. The wetted mass is passed through a No. 10 stainless steel screen and dried in the dark at 110° F. The dried granules are passed through a No. 20 stainless steel screen, and the additional quantity of corn starch, guar gum and magnesium stearate added. The mixture is compressed using a 8/32" standard curvature punch into tablets and the tablet may be coated with a conventional protective film.

EXAMPLE 2

| | Per tablet, mg. |
|---|---|
| Hydrocortisone | 4.0 |
| Sodium α - (1 - p - methylthiobenzyl - 2 - methyl-5-methoxy-3-indolyl)-propionate | 7.5 |
| Calcium phosphate, dibasic | 50.0 |
| Lactose | 45.0 |
| Ethyl cellulose (as 5% in ethanol) | 2.0 |
| | 108.5 |
| Add: | |
| Starch, corn | 5.3 |
| Magnesium stearate | 1.0 |
| | 114.8 |

The hydrocortisone, indolyl propionate, calcium phosphate and lactose are mixed to a fine powder, i.e. through 60 mesh. The powder is granulated with the ethyl cellulose solution and the moist mass passed through a No. 10 screen, dried at 110° F. and rescreened through a No. 20 stainless steel screen. The corn starch and magnesium stearate are added and the mixture compressed to tablets with an 8/32" punch. These tablets may be coated with a protective film.

EXAMPLE 3

| | Per tablet, mg. |
|---|---|
| Hydrocortisone | 8.0 |
| 1 - p - chlorobenzoyl - 2 - methyl - 5 - methoxy - 3-indolyl-acetic acid | 10.00 |
| Lactose | 87.17 |
| Starch, corn | 5.00 |
| Cellulose acetate phthalate (2% in acetone | 2.00 |
| Add: | |
| Starch, corn | 5.00 |
| Guar gum | 5.00 |
| Magnesium stearate | 2.00 |

The tablets are prepared as described in Example 1.

EXAMPLE 4

| | Per tablet, mg. |
|---|---|
| Dexamethasone | 0.125 |
| Sodium α - (1 - p - methylthiobenzyl - 2 - methyl-5-methoxy-3-indolyl)-propionate | 7.50000 |
| Calcium phosphate, dibasic | 80.0000 |
| Magnesium stearate | 1.0000 |
| Add: | |
| Starch, corn | 5.0000 |
| Magnesium stearate | 1.0000 |

The tablets are prepared as described in Example 1.

EXAMPLE 5

| | Per tablet, mg. |
|---|---|
| Dexamethasone | 0.125 |
| 1 - (p - chlorobenzoyl) - 5 - methoxy - 2 - methyl-indole-3-acetic acid | 25.0 |
| Calcium phosphate, dibasic | 80.0 |
| Magnesium stearate | 1.0 |
| Add: | |
| Corn starch | 5.0 |
| Magnesium stearate | 1.0 |

The tablets are prepared as in Example 1.

EXAMPLE 6

Example 5 is followed except that twice as much dexamethasone, namely 0.250 mg., is used.

EXAMPLE 7

Examples of capsules containing the steroid and non-steroid anti-inflammatory agent follow:

| | Per tablet, mg. |
|---|---|
| Dexamethasone | 0.250 |
| Sodium α - (1 - p - methylthiobenzyl - 2 - methyl-5-methoxy-3-indolyl)-propionate | 7.5000 |
| Lactose | 420.4775 |
| Magnesium stearate | 2.0000 |

EXAMPLE 8

| | Per capsule, mg. |
|---|---|
| Cortisone | 5.25 |
| Sodium α - (1 - p - methylthiobenzyl) - 2 - methyl-5-methoxy-3-indolyl)-propionate | 7.50 |
| Lactose | 415.25 |
| Magnesium stearate | 2.00 |

The mixed powder is encapsulated.

EXAMPLE 9

| | Per capsule, mg. |
|---|---|
| Hydrocortisone | 10.0 |
| 1 - p - chlorobenzoyl - 2 - methyl - 5 - methoxy - 3-indolyl-acetic acid | 25.00 |
| Lactose | 250.00 |
| Magnesium stearate | 1.00 |

The powdered components are mixed and put into a No. 3 opaque gelatin capsule.

EXAMPLE 10

In Example 9, instead of hydrocortisone, there is used 0.125 mg. of dexamethasone.

EXAMPLE 11

The following represents examples of sterile aqueous suspensions of the therapeutic mixtures described above:

| | Per ml., mg. |
|---|---|
| Prednisolone | 1.125 |
| Sodium α - (1 - p - methylthiobenzyl - 2 - methyl-5-methoxy-3-inodlyl)-propionate | 7.500 |
| Glyceryl monostearate | 10.000 |
| Polysorbate 80 | 0.050 |
| Sodium chloride | 0.500 |
| Methyl parahydroxybenzoate | 0.150 |
| Pyrogen-free water to make | 1.000 |

The glyceryl monostearate and Polysorbate 80 are dispersed at 65° C. in water containing the sodium chloride and methyl paraphydroxybenzoate. The resulting mixture is sterilized by autoclaving. After the vehicle has cooled to room temperature sterile microcrystalline prednisolone and sodium α-(1-p-methylthiobenzyl-2-methyl-5-methoxy-3-indolyl)-propionate are dispersed therein. The resulting suspension is subdivided into amber vials with protection from light during the subdivision.

vehicle. Sufficient additional water is then added to give the desired volume and it is put into vials.

Patients suffering from various allergic and/or inflammatory diseases and conditions who had previously been on steroid therapy were put on therapy using mixtures of indomethacin and a steroid. The results in terms of amounts needed, side effects and increased physical activity of the patent are given in the following table:

TABLE

| Patient No. | Prior treatment | | | | New treatment | | | Side effects | | Change in physical activity (if any) |
|---|---|---|---|---|---|---|---|---|---|---|
| | Disease | Steroid Used | Amount (mg./day) | Duration, yr. | Indomethacin, (mg./day) | Name | Steroid, (mg./day) | Prior treatment | Present treatment | |
| 1 | 1 | A | 10 | 10 | 100 | A | 6.5 | | | None. |
| 2 | 2 | A | 10 | 0.5 | 200 | A | 5.0 | Cushingoid | Slight nausea | Do. |
| 3 | 1 | A | 10 | 9.0 | 200 | A | 2.5 | do | None | Increased. |
| 4 | 1 | B | 0.75 | 1.0 | 200 | A | 2.5 | Ulcers | Slight dizziness | None. |
| 5 | 1 | C | 8 | 3 | 150 | C | 6.0 | | | Increased. |
| 6 | 1 | C | 8 | 12.0 | 150 | C | 4.0 | Edema, ulcer, cushingoid. | None | Do. |
| 7 | 1 | C | 8 | 12 | 100 | C | 6.0 | do | do | None. |
| 8 | 1 | C | 6 | 12 | 200 | C | 2.0 | Myasthemia | do | Increased. |
| 9 | 2 | B | 0.75 | 4 | 200 | B | 0.38 | | Much less wheezing. | None. |
| 10 | 1 | B | 0.5-0.75 | 6 | 150 | B | 0.25-0.38 | Cushingoid | None | Increased. |
| 11 | 1 | B | 0.75-1.5 | 4 | 150 | B | 0.375 | Edema, Cushingoid | do | Do. |
| 12 | 1 | B | 0.5 | 10 | 150 | B | 0.05 | | | Do. |
| 13 | 1 | B | 1.0 | 5 | 400 | B | 0.5 | Rash, edema, blood dyscrasic. | Edema | Do. |
| 14 | 3 | D | 8 | 10 | 200 | A | 5 | | | None. |
| 15 | 1 | E | 1.8 | 2 | 125 | E | 0.6 | Cushingoid | None | Do. |
| 16 | 2 | F | 4.5 | 3 | 200 | F | 3 | do | do | Do. |
| 17 | 1 | G | 7.5 | | 150 | G | 5 | | | |
| 18 | 1 | F | 3.0 | | 150 | F | 2.25 | | | |
| 19 | 1 | H | 3.0 | | 150 | H | 1.5 | | | |
| 20 | 1 | G | 12.5 | | 150 | G | 7.5 | | | |

Disease: 1—Rheumatoid Arthritis; 2—Bronchial Asthma; 3—Rheumatoid Spondylitis.
New treatment (name): A—Prednisone; B—Dexamethasone; C—Triamcinolone; D—6-α-methylprednisolone; E—Betamethasone; F—Fluprednisolone; G—Prednisolone; H—Paramethasone.

EXAMPLE 12

|  | Per ml., mg. |
|---|---|
| Dexamethasone | 5.0 |
| 1-p-chlorobenzoyl-2-methyl-5-methoxy-3-indolyl-acetic acid | 0.050 |
| Sodium carboxymethylcellulose | 1.00 |
| Polysorbate 80 | 0.02 |
| Sodium chloride | 0.45 |
| Benzyl alcohol | 0.90 |
| Pyrogen-free water to make 1.00 ml. | |

The sodium carboxymethylcellulose, polysorbate 80, sodium chloride and benzyl alcohol are dissolved in approximately 80% of the required volume of pyrogen-free water. The solution is sterilized by filtration through bacteria-resistant candles. Sterile microcrystalline hydro cortisone and 1-p-chlorobenzoyl-2-methyl-5-methoxy-3-indolyl-acetic acid are added to and dispersed in the sterilized vehicle. Sufficient additional water is then added to give the desired volume and it is put into vials.

What is claimed is:

1. A pharmaceutical preparation in unit dosage form comprising 25 mg. of indomethacin and 0.125 mg. of dexamethasone.

2. A pharmaceutical preparation in unit dosage form comprising 25 mg. of indomethacin and 0.250 mg. of dexamethasone.

References Cited

FOREIGN PATENTS 63,464  2/1961  Australia.

OTHER REFERENCES

Wiesel et al., The Am. J. of the Medical Services, vol. 232, pp. 415–418 (October 1956).

ALBERT T. MEYERS, Primary Examiner
J. GOLDBERG, Assistant Examiner

U.S. Cl. X.R.
424—274